United States Patent [19]

Yamaguchi

[11] Patent Number: 4,903,821
[45] Date of Patent: Feb. 27, 1990

[54] INTERMITTENT DRUM FEEDER WITH ADJUSTABLE LOADING POSITION

[75] Inventor: Tameaki Yamaguchi, Toyonaka, Japan

[73] Assignee: Tsubakimoto Bulk Systems Corporation, Osaka, Japan

[21] Appl. No.: 204,711

[22] Filed: Jun. 9, 1988

[30] Foreign Application Priority Data

Sep. 6, 1987 [JP] Japan .............................. 62-88022[U]
Sep. 6, 1987 [JP] Japan .............................. 62-88023[U]

[51] Int. Cl.$^4$ .............................................. B65G 47/00
[52] U.S. Cl. .................................. 198/550.7; 198/671; 198/703; 198/708; 222/412
[58] Field of Search ............... 198/703, 708, 612, 671, 198/701, 707; 222/624, 625, 412

[56] References Cited

U.S. PATENT DOCUMENTS

| | | | |
|---|---|---|---|
| 2,504,786 | 4/1950 | Bailey | 222/624 X |
| 3,134,478 | 5/1964 | Haen et al. | 198/671 X |
| 3,139,862 | 7/1964 | Rutten et al. | 198/671 X |
| 3,163,334 | 12/1964 | Blanshine | 222/412 |
| 3,578,183 | 5/1971 | Larger | 198/703 X |
| 3,667,665 | 6/1972 | Spencer | 222/412 |
| 4,454,943 | 6/1984 | Moller | 198/671 X |
| 4,493,413 | 1/1985 | Harrell | 198/708 |

FOREIGN PATENT DOCUMENTS

| | | | |
|---|---|---|---|
| 28115 | 5/1981 | European Pat. Off. | 198/703 |
| 5165 | 1/1977 | Japan | 198/703 |
| 263528 | 11/1986 | Japan . | |

Primary Examiner—Robert J. Spar
Assistant Examiner—James R. Bidwell
Attorney, Agent, or Firm—Dann, Dorfman, Herrell & Skillman

[57] ABSTRACT

A feed mechanism for use with a bucket conveyor in which spaced-apart buckets are supported between spaced-parallel conveyor chains. The mechanism has a cylindrical trough with a feed auger extending across the chains. The trough has a discharge slot in its bottom coextensive with the width of the bucket. Materials fed to one end of the auger are advanced along the length of the trough. The discharge slot is adjustable in width so that it may be reduced for the major part of its length but is fully open at its remote end. A hollow cylindrical drum surrounds the auger to be rotated in synchronism with the chains. The drum has openings around its circumference to register with the open tops of the buckets, and skirts are provided between the discharge openings and the drum openings to direct the material from the discharge openings through the drum openings.

6 Claims, 5 Drawing Sheets

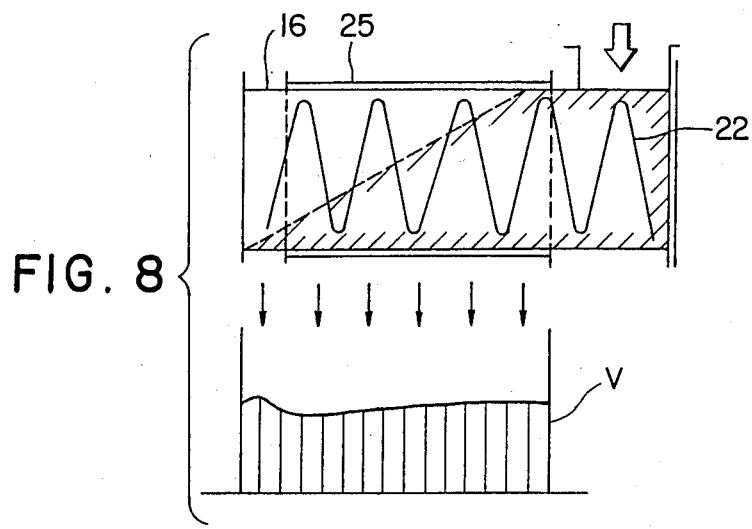
FIG. 8
FIG. 9
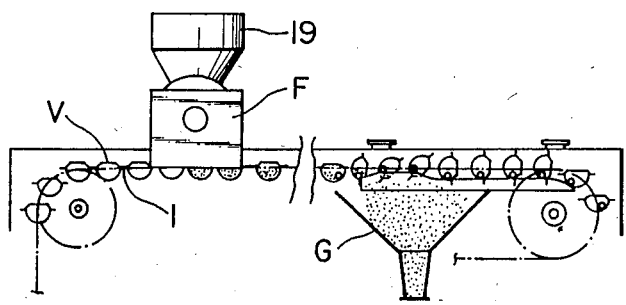

INTERMITTENT DRUM FEEDER WITH ADJUSTABLE LOADING POSITION

FIELD OF THE INVENTION

The present invention relates to feeders for use with bucket conveyors which are supported between traveling chains. The invention is particularly adapted to drum feeders which control the discharge of materials of differing sizes and/or shape which have a steep angle of repose, into the buckets and prevent the flow of material between the buckets.

BACKGROUND OF THE INVENTION

A typical example of prior art drum feeders is shown in Japanese Laid-Open Patent Specification 263528/1986 in which a chute discharges materials into a drum having a series of apertures spaced circumferentially about the drum so that as the buckets travel beneath the drum, the drum is rotated in synchronism with the travel of the buckets to discharge material into the buckets through the apertures in the drums. In a device of this character, it is difficult to control the flow of material so as to avoid excessive discharge into individual buckets, or to provide distribution of the material throughout the entire width of the bucket between the chains.

Attempts to provide distribution of the material transversely of the bucket have involved complex trippers or scrapers to attempt to level the material within the bucket or else to provide channelized discharges at various points across the width of the bucket. Such devices render the feeding mechanism unduly complicated and subject to malfunction.

SUMMARY OF THE INVENTION

The present invention provides an improved feeder for bucket conveyors in which the materials fed into the bucket are distributed uniformly across the full width of the bucket between the conveyor chains, at the same time preventing discharge of the material through the spaces between adjacent buckets.

The present invention enables the apparatus to be adjusted to accommodate to a variety of materials, particularly materials having a steep angle of repose.

Distribution of the material across the width of the bucket is effected by a screw auger disposed transversely between the chains within a feeding trough having a discharge opening in its bottom for discharging the material into the bucket.

In a preferred embodiment of the invention, the screw auger and trough are mounted within an elongated drum of a drum feeder so as to permit continuous operation of the bucket conveyor in association with the drum feeder as the buckets are filled by the feeder.

The materials fed into the trough at one end and a means is provided to regulate the bottom opening in the trough so as to assure distribution of the material throughout the length of the trough, the opposite end of the trough is adapted to assure discharge of the material to prevent excessive build-up within the trough.

More specifically, the present invention provides a cylindrical trough having a screw auger therein with an opening extending along the axes of the trough and auger. To afford regulation of the discharge from the trough, a sleeve circumscribes the trough and is adjusted circumferentially to regulate the free passageway provided by the opening.

DESCRIPTION OF THE DRAWINGS

All of the objects of the invention are more fully set forth hereinafter with reference to the accompanying drawing which illustrates a preferred embodiment of the invention.

FIG. 8 diagrammatically illustrates the distribution of the material in the trough and bucket, respectively; and FIG. 9 illustrates diagrammatically an arrangement of a bucket conveyor to be filled by the drum feeder of the present invention for subsequent discharge at a remote location.

DESCRIPTION OF THE PREFERRED EMBODIMENT

Figure 1:
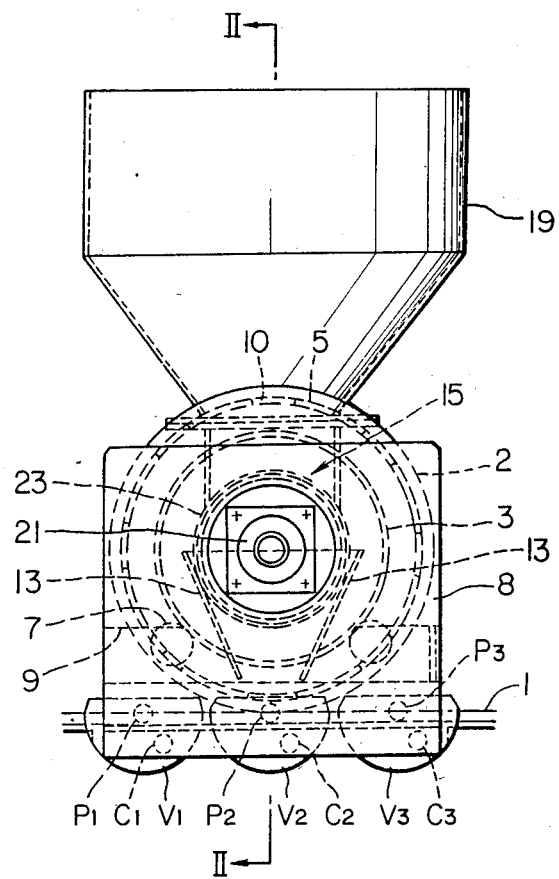
FIG. 1 is a front view of a drum feeder showing its relation to the bucket conveyor.
Figure 2:
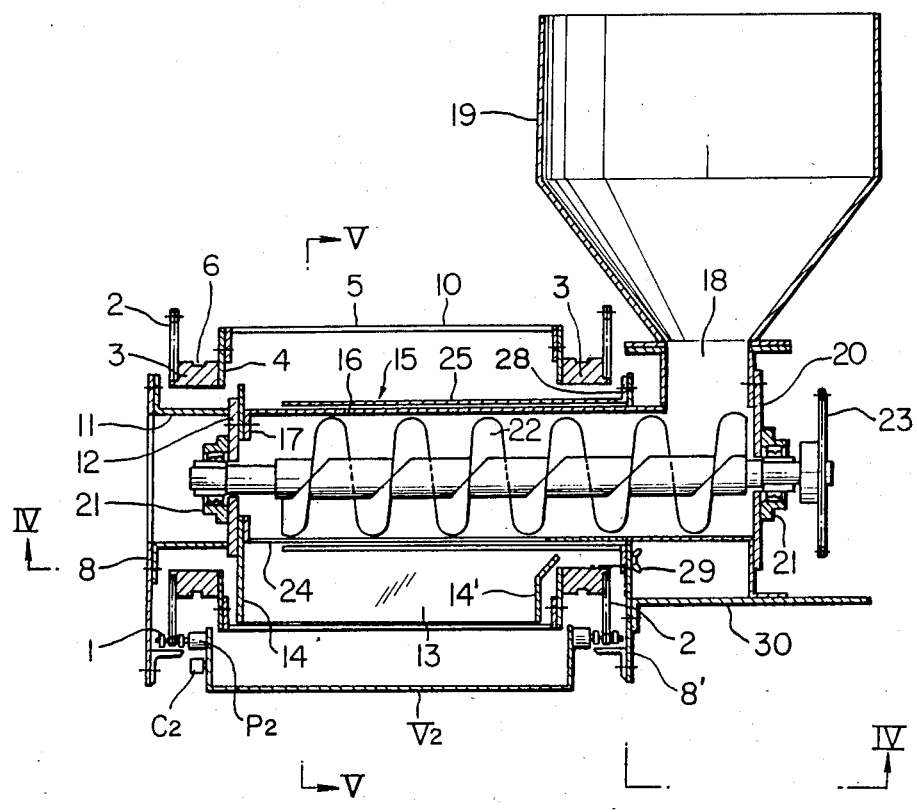
FIG. 2 is a sectional view taken on the line II—II of FIG. 1.

Referring to FIGS. 1 and 2, the bucket conveyor comprises a large number of adjoining buckets V1, V2 ... Vn, which are capable of freely overturning between chains 1,1 mounted to travel on tracks on opposite sides of a frame 8. The chain has rollers for supporting the conveyor and the links of the chain engage the teeth of sprockets 2,2 at the front and rear of the feeder mechanism. The buckets are pivotally mounted on the chain as indicated at P and have projecting cam pins C for controlling the dumping operation of the buckets. As shown in FIG. 9, the conveyor chains carry the buckets V to a feed station under the feed mechanism F which is made in accordance with the invention. After the feed mechanism F loads the buckets with the particulate material to be conveyed, the chains 1 convey the buckets to a discharge station G where the buckets V are dumped to discharge the particulate material into a receiver (not shown).

Figure 3:
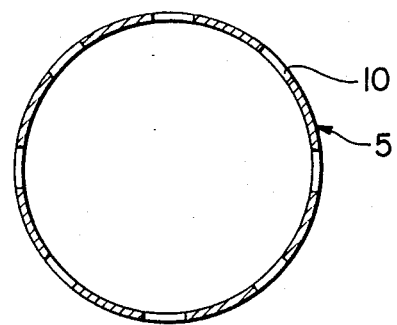
FIG. 3 is a sectional view through the drum showing the intermittent openings therein.

The feed mechanism F operates in synchronism with the chains 1 by reason of the sprockets 2 meshing with the chains 1. The front and rear sprockets 2 are interconnected by support rings 3 having internal connection rings 4 projecting outwardly therefrom to support a cylindrical drum 5 concentric with the sprockets 2,2. As shown in FIG. 1, rollers 7 are rotatably mounted on a support frame 9 whose ends are fixed to the fixed frame 8. The drum 5 is therefore free to rotate on the rollers 7 concentrically with the sprockets which are, in turn, driven by meshing with the chains 1,1 of the conveyor. As shown in FIG. 3, the drum 5 has circumferentially spaced discharge openings 10 which interface with the upper openings of the buckets V and are spaced around the drum with the same pitch as the pitch of the buckets V on the chain 1. The portions of the drum between the openings 10 thereby cover the spaces between the openings of the buckets V to prevent discharge of the material from within the drum between the buckets.

The drum and sprockets provide a free interior space centrally therethrough in which a cylindrically-shaped supporting member 11 projects from the forward frame part 8. The forward frame part 8 supports the flanged end 17 of a cylindrical trough 16 in which a screw auger or feeder 22 extends axially from the rear frame member 8. The screw auger 22 is supported in bearings 21 in a front end plate 12 on the support member 11, and in a rear end plate 20 which, in turn, is supported on the trough 16 at its rear end. The trough is supported on a front frame 8 and a rear frame 8' and has a feed opening 18 coupled to a hopper 19 provided at the rear end of the trough 16. The motor base 30 is secured to the rear frame 8'. A sprocket 23 is fixed to the auger so that the screw auger 22 may be driven to transport objects from the hopper 19 along the length of the trough 16. The trough 16 and auger 22 cooperate to form a feed auger arrangement designated generally at 15 in FIG. 2. In order to funnel the material from the feed trough into the openings 10 of the drum 5, skirt portions 13,13 are mounted on the end plate 12 by an end plate 14 at the front. A corresponding end plate 14' is provided at the rear of the skirt and projects upwardly to a position closely underlying the trough 16.

As shown in FIG. 2, the trough 16 has an axially-extending bottom opening 24 which extends from the skirt end plate 14 to a point closely adjacent the complementary skirt end plate 14'. It should be noted that the skirts 13 terminate closely adjacent the drum 5 so that as the drum rotates, the portions of the drum intermediate the openings 10 serve to restrict the material flowing from the skirt. The skirt and drum thereby function as a sluice valve which operates in timed relation to the travel of the conveyor buckets through the feed station.

In the illustrated embodiment of the invention, the opening 24 is of uniform width throughout its length and provides a restricted discharge for the material fed by the auger so that as the material is advanced toward the front by the auger screw 22, it is discharged throughout the full length of the opening 24, thereby providing a distribution of the material across the full width of the bucket conveyor between the chains 1,1.

Figure 4:
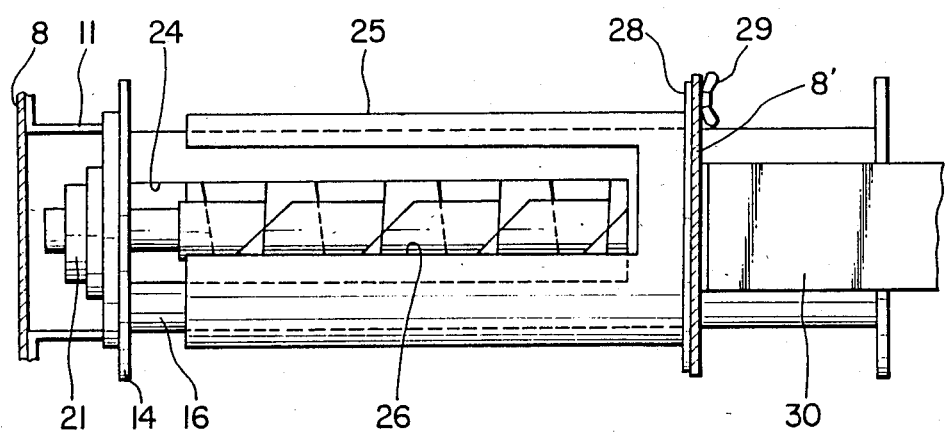
FIG. 4 is an inverted sectional view taken on the line IV—IV of FIG. 2.

In order to regulate the discharge through the opening 24, a sleeve 25 is fitted over the trough in a rotative manner. The sleeve has a longitudinal opening 26 whose width is substantially equivalent to that of the opening 24. As shown in FIGS. 2 and 4, the length of the sleeve 25 is less than the length of the trough 16 so that the front end of the sleeve 25 is positioned rearwardly relative to the front end of the trough. When the openings 24 and 26 are in precise registry, the width of the common opening of the feed opening provided by the opening 24 is uniform throughout its length. However, when the sleeve 25 is rotated relative to the trough 16, the openings 24 and 25 are offset so that in the area where the sleeve 25 overlaps the trough 16, the width of the feed opening provided by the openings 24 and 26 is reduced. However, the width of the opening at the forward end remains the same.

Figure 5:
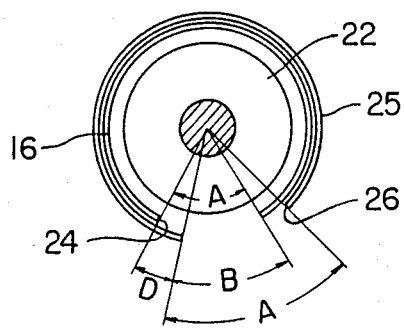
FIG. 5 is a fragmentary sectional view taken on the line V—V of FIG. 2, showing the relationship of the sleeve to the cylindrical trough.
Figure 6:
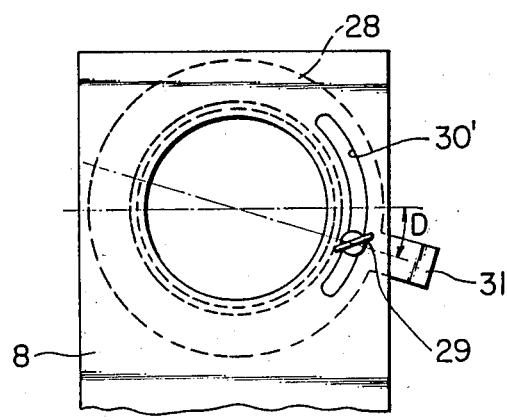
FIG. 6 is a fragmentary rear view showing the adjustment of the sleeve on the trough.

As illustrated in FIGS. 4, 5 and 6, the angular extent of the openings is identified by the angle A in both the sleeve and the trough. When the sleeve is adjusted by the angle D, the central angle 8 remains open to provide the discharge area in that section of the trough 16 which the sleeve 25 overlaps. The central angle B of the discharge opening is equal to A minus D. When D is equal to zero, the opening is the maximum at A and if D is equal to A, the opening is closed. The reduced width of the opening provided by the central angle B restricts the discharge of material conveyed along the trough by the screw auger 22. By restricting the opening, more material travels throughout the length of the trough where the material will be distributed across the full width of the bucket. In the event of bulky items failing to pass through the restricted opening, the auger will convey them to the area of the trough where the sleeve 25 does not overlap so that the full width of the opening A is provided through which the material may be discharged. By adjusting the angle D in accordance with the character of the material being fed through the hopper, it is possible to obtain a uniform distribution of material throughout the full width of the bucket.

FIG. 8 is a diagrammatic showing of the accumulation of material within the trough 16 and illustrates how the material is deposited within the bucket V. The distribution may be controlled not only by regulating the width of the openings through its central angle B, but also the distribution may be controlled by the speed of rotation of the screw auger 22. To anchor the sleeve in its adjusted position on the trough, the rear flange 28 of the sleeve is fixed by way of a thumb screw 29 which passes through an arcuate slot 30' in the frame member 8'. A handle may be provided at 31 (see FIG 6) to facilitate angular adjustment of the sleeve.

Figure 7:
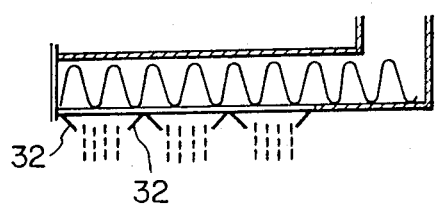
FIG. 7 diagrammatically illustrates the use of chutes to further regulate distribution of the material across the width of the bucket between the chains.

For certain materials, it may be desired to modify the openings to better accommodate to the regulation of the flow therethrough. For example, one or both of the openings may be tapered or may be curved, depending on the characteristics of the material being advanced by the screw auger 22. In lieu of controlling the flow by controlling the openings, the flow may be directed transversely by baffles which extend between the skirts 13 at various positions along the length of the discharge 24 in the trough 16. FIG. 7 diagrammatically illustrates the use of baffles 32 to effect a variable distribution of the material being discharged from the auger mechanism 15. The baffles may be variable in width and may be adjustable in position to provide the desired distribution of the flow.

Moreover, it is to be noted that the feed mechanism according to the present invention is also useful for uniformly or non-uniformly distributing material across the full width of a belt conveyor and the like. Also, the intermittent-opening drum may be driven by means of a separate driving means.

While a particular embodiment of the present invention has been herein illustrated and described, it is not intended to limit the invention to such disclosure but changes and modifications may be made therein and thereto within the scope of the following claims.

We claim:

1. A feed mechanism comprising:
a cylindrical trough having at the lower part thereof an axially extending material discharge opening,
a feed auger screw disposed coaxially with said trough,
means to feed material to one end of said auger screw,
means to rotate said auger screw to distribute the material from said one end along the length of said trough, and
a sleeve circumscribing said trough and said opening, said sleeve having an opening adapted to at least partially register with the opening of said through whereby the flow passing through said through opening may be regulated by angularly adjusting said sleeve on said trough to afford restriction of the flow of material from said trough along its length through said registering openings, said sleeve extending from the feed end of said trough to a point spaced from the opposite end of said through opening so as to cause said trough opening to be unrestricted at said opposite end of said trough.

2. A feed mechanism comprising: a cylindrical trough having at the lower part thereof an axially extending material discharge opening,
 a feed auger screw disposed coaxially with said trough,
 means to feed material to one end of said auger screw,
 means to rotate said auger screw to distribute the material from said one end along the length of said trough,
 a sleeve circumscribing said trough and said opening, said sleeve having an opening adapted to at least partially register with the opening of said trough whereby the flow passing through said trough opening may be regulated by angularly adjusting said sleeve on said trough to afford restriction of the flow of material from said trough along its length through said registering openings, and a bucket conveyor in which spaced-apart buckets are supported at their ends between spaced parallel conveyor chains, said auger screw being operable to distribute material across the full width of the bucket,
 said trough being surrounded by an intermittent-opening drum having a series of openings spaced circumferentially around the drum at a pitch corresponding to the spacing of the conveyor buckets on said conveyor chain, said drum being coaxially secured to a sprocket engageable with said conveyor chains, and said feed mechanism operable to discharge material through its opening into and through the drum openings for feeding material to said conveyor buckets.

3. A mechanism according to claim 2 wherein the sleeve extends from the feed end of said trough to a point spaced from the opposite end of said opening so as to cause said trough opening to be unrestricted at said opposite end of said trough.

4. A mechanism according to claim 3 including skirts depending from said trough to direct the material from said trough opening into said drum openings when said drum openings are positioned below said skirt.

5. A mechanism according to claim 4 wherein said skirt cooperates with said drum to provide a sluice valve arrangement controlling the flow of material into said buckets.

6. A feed mechanism comprising:
 a cylindrical trough having at the lower part thereof an axially extending material discharge opening,
 a feed auger screw disposed coaxially with said trough,
 means to feed material to one end of said auger screw,
 means to rotate said auger screw to advance the material from said one end along the length of said trough,
 a sleeve circumscribing said trough and said opening, said sleeve having an opening adapted to at least partially register with the opening of said trough whereby the flow passing through said trough opening may be regulated by angularly adjusting said sleeve on said trough to afford restriction of the flow of material from said trough along its length through said registering opening, and
 an intermittent-opening drum surrounding said sleeve and having a series of openings spaced circumferentially around the drum at a predetermined pitch, said mechanism being operable to discharge material through its opening into and through the drum openings.

* * * * *

UNITED STATES PATENT AND TRADEMARK OFFICE
CERTIFICATE OF CORRECTION

PATENT NO. : 4,903,821
DATED : February 27, 1990
INVENTOR(S) : Tameaki Yamaguchi It is certified that error appears in the above-identified patent and that said Letters Patent is hereby corrected as shown below:

In the Headings on the front page, the foriegn priority data should read as follows:

--[30] Foreign Application Priority Data
June 9, 1987 [JP] .............62-88022[U]
June 9, 1987 [JP] .............62-88023[U]--

Col. 4, line 68, "through" should be --trough--;

Col. 5, line 1, "through" (second occurrence) should be --trough--;
line 8, "through" should be --trough--;

Col. 6, line 8, "claim 3" should be --claim 2--.

Signed and Sealed this

Eleventh Day of December, 1990

Attest:

HARRY F. MANBECK, JR.

*Attesting Officer*   *Commissioner of Patents and Trademarks*